Sept. 1, 1925.

F. HODGKINSON 1,551,565

HELICAL REDUCTION GEAR

Filed Oct. 4, 1921  2 Sheets-Sheet 1

Francis Hodgkinson
INVENTOR

BY David C. Davis
ATTORNEY

Sept. 1, 1925. 1,551,565
F. HODGKINSON
HELICAL REDUCTION GEAR
Filed Oct. 4, 1921 2 Sheets-Sheet 2

Francis Hodgkinson
INVENTOR
BY David C Davis
ATTORNEY

Patented Sept. 1, 1925.

1,551,565

UNITED STATES PATENT OFFICE.

FRANCIS HODGKINSON, OF SWARTHMORE, PENNSYLVANIA, ASSIGNOR TO WESTINGHOUSE GEAR AND DYNAMOMETER COMPANY, A CORPORATION OF PENNSYLVANIA.

HELICAL REDUCTION GEAR.

Application filed October 4, 1921. Serial No. 505,240.

*To all whom it may concern:*

Be it known that I, FRANCIS HODGKINSON, a subject of Great Britain and Ireland, and a resident of Swarthmore, in the county of Delaware and State of Pennsylvania, have invented a new and useful Improvement in Helical Reduction Gears, of which the following is a specification.

My invention relates to reduction gearing and more particularly to the double-reduction type in which the power is divided and then reunited, and it has for its object to provide apparatus of the character designated in which a better distribution of load between the gear elements shall be assured.

In the drawings, Fig. 1 is a view, partially in plan and partially in section, of a double-reduction gear set incorporating my improvement;

Figure 2:
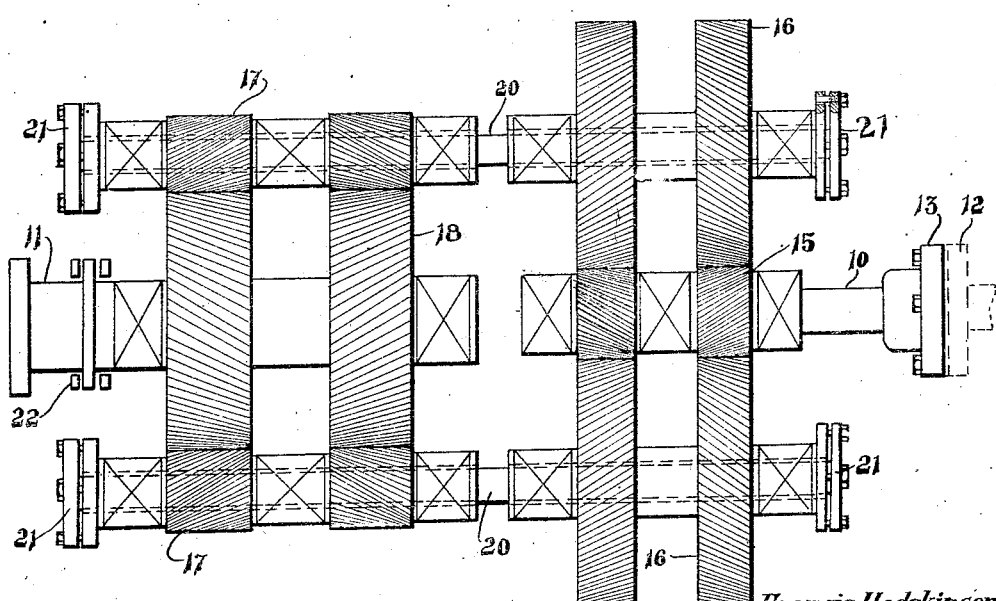
Fig. 2 is a plan view of an old form of double reduction gear set.

Double-reduction gearing of the type shown in Fig. 2 has been used, but the operation thereof has not been satisfactory under all conditions on account of poor distribution or lack of distribution of the load. In this figure, I show a driving shaft 10 and a driven shaft 11 in axial alinement. The driving shaft is connected to a pinion 15 of the double helical type, the latter meshing with a plurality of intermediate gears 16 of the double helical type which, in turn, respectively drive the double helical pinions 17, meshing with a common driven gear 18. Distribution of the load between the sets of connected pinions 17 and gears 16 is secured by providing flexible shafts 20 therebetween, and balancing of the load between the helices of each pinion or gear is secured by providing for relative longitudinal movement thereof. The latter result may be effected by providing couplings 13 and 21 which permit of longitudinal movement of the pinion 15, the gears 16, and the pinions 17, thereby allowing the gears and pinions to move to balance the load between the helices thereof. In practice, however, this arrangement has not proved to be satisfactory on account of the resistance of the couplings to longitudinal movement of pinions and gears, and this is particularly true of the couplings 21 for the intermediate pinions 17 on account of the large torques and consequently large frictional forces present in connection therewith.

Accordingly, it is the object of my invention to provide double-reduction gearing of the character indicated which shall not be subject to the objection noted, and which shall assure a distribution of load between the sets of connected intermediate gears and pinions and a division of the load between the helices of the intermediate pinions. I have, therefore, provided a construction in which rigid couplings are used.

Figure 1:
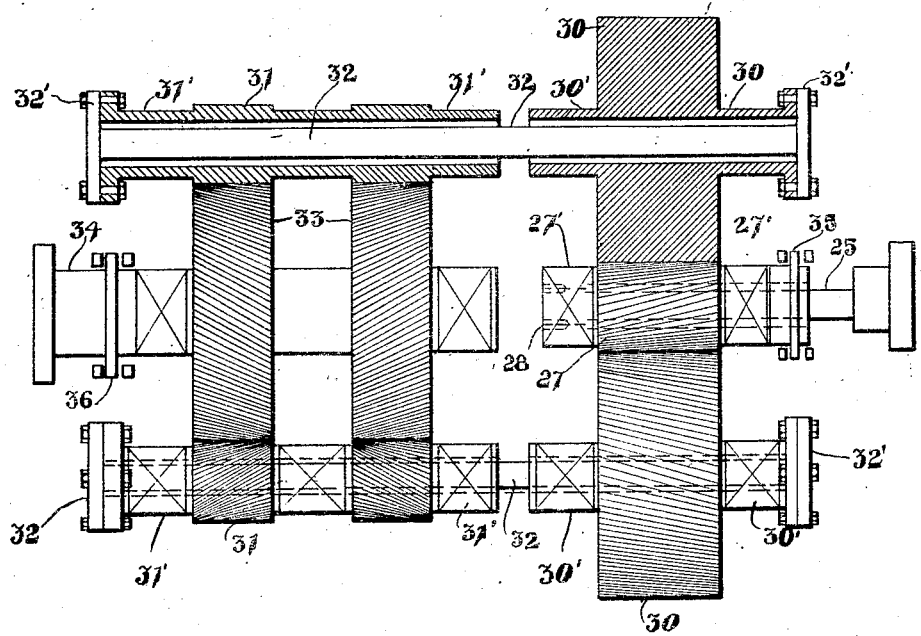

Referring now to Fig. 1 for a more detailed description of my invention, I show a flexible driving shaft 25 connected to the hollow pinion 27 by any suitable means, for example, by the keys 28. The pinion 27 meshes with the intermediate gears 30 and the latter are in turn connected to the intermediate double helical pinions 31 by means of flexible shafts 32 connected to the pinions and gears, respectively, by means of rigid couplings 32'. The pinions 31 mesh with the double helical driven gear 33 carried by the driven shaft 34. The pinion 27, gears 30, and pinions 31 are respectively provided with bearing portions 27', 30' and 31' for cooperation with any suitable bearings, not shown.

The flexible shafts 32 assure a division of the load between the sets of connected intermediate pinions and gears; but, in order to balance the load between the helices of the pinions 31, the sets must be able to move longitudinally. The latter result is provided for by having single rows of teeth on the driving pinion 27 and intermediate gears 30, preferably arranged at a small helix angle, for example, 15 degrees.

Thrust bearings 35 and 36 are associated with the driving pinion 27 and the driven shaft 34 to maintain these elements in position and to transmit thrust to the supporting structure.

From the foregoing, the operation of apparatus made in accordance with Fig. 1 will be obvious. Power from the pinion 27 is divided between the sets of connected intermediate gears and pinions 30 and 31, respectively, and transmitted by the latter to the driven gear 33. The flexible shafts 32 assure the transmission of a share of the load by each of the connected sets of intermediate pinions and gears and the ability of the latter to move longitudinally assures that the load on the pinions 31 will be balanced between the helices thereof. The slight amount of play unavoidably present in the thrust bearing 35 is advantageous in that, it permits the pinion 27 to move longitudinally to secure more even tooth pressures between the pinion 27 and the intermediate gears 30.

Figure 3:
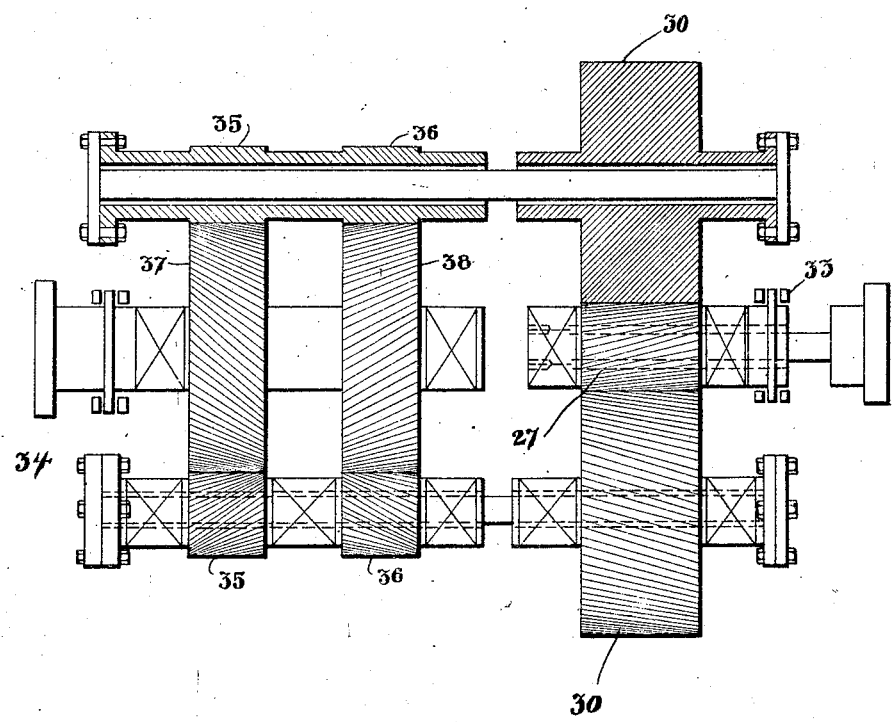
Fig. 3 is a plan view of a modified form of my invention.

In Fig. 3, I show a form of my invention in which the longitudinal thrusts of the helical pairs of meshing teeth are balanced. The rows of teeth 36 and 38 are provided at such a helix angle as to develop a longitudinal component of thrust which counterbalances the opposite components due to the rows of teeth 27 and 30 and 35 and 37.

From the foregoing, it will be seen that I have devised a double reduction gear in which the power is divided and reunited by suitable gear devices and one in which the distribution of load on the devices is assured at all times.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. A reduction gear comprising a driving pinion member having a single row of teeth, a plurality of hollow intermediate gear members, each having a row of teeth meshing with said pinion teeth, the pinion and gear teeth being arranged at small helical angles, hollow intermediate pinions having right and left hand rows of helical teeth, flexible shafts passing through pairs of intermediate gears and pinions, rigid couplings for connecting the outer sides of the pairs of intermediate gears and pinions to the ends of the flexible shafts, and a driven gear member having right and left hand rows of helical teeth meshing with the teeth of the intermediate pinion members.

2. A reduction gear comprising a driving pinion member having a row of teeth arranged at a small helical angle, a thrust bearing to limit axial movement of the pinion member, a hollow intermediate gear member having a row of teeth meshing with the teeth of said driving pinion member and having a corresponding helical angle, a hollow intermediate pinion member having right and left hand rows of helical teeth, a flexible shaft passing through the hollow intermediate gear and pinion members, rigid couplings for connecting an outside end of the pinion member and an outside end of the intermediate gear member to the ends of said flexible shaft, a driven gear member having right and left hand helical teeth meshing with the teeth of said intermediate gear member, and a thrust bearing associated with the driven gear member.

3. A reduction gear comprising a hollow driving pinion having a single row of teeth arranged at a small helix angle, a pair of hollow intermediate gears meshing with the pinion and having teeth arranged at a corresponding angle, a pair of hollow intermediate pinions having right and left hand helically arranged teeth, flexible shafts extending through the intermediate gears and the intermediate pinions and connected thereto at the outside ends thereof, and a driven gear having rows of right and left hand helical teeth meshing with the teeth of said intermediate pinions.

4. A reduction gear comprising a driving pinion member having a single row of teeth arranged at a small helical angle, a hollow intermediate gear member having a single row of teeth arranged at the same helical angle as the pinion teeth and meshing with the latter, a hollow intermediate pinion member having opposed rows of teeth arranged at different helical angles, a driven gear having similar rows of teeth meshing with the teeth of the intermediate pinion member, whereby the longitudinal thrust developed in one direction between the driving pinion and the intermediate gear member and between one of the rows of teeth of the intermediate pinion member and one of the rows of teeth of the driven gear is balanced by the longitudinal thrust developed in the other direction between the other row of teeth of the intermediate pinion member meshing with the other row of teeth of the driven gear, a flexible shaft extending through the hollow intermediate gear and pinion members, and rigid couplings for connecting the ends of the flexible shaft to the intermediate gear and pinion members.

5. A reduction gear comprising a driving pinion member having a single row of helical teeth, means for limiting the longitudinal movement of the driving pinion, a plurality of hollow intermediate gear members meshing with the driving pinion, an intermediate pinion having right and left hand rows of helical teeth driven by each intermediate gear, a driven gear having right and left hand rows of helical teeth meshing with the intermediate pinions, and means for limiting the longitudinal movements of the driven gear, the helix angle of one row of teeth of the driven gear and the intermediate pinions being such as to develop a longitudinal component of thrust which reacts equally against the thrust created by the remaining row of teeth of the driven gear and the intermediate pinions and by the intermediate gears and the driving pinion.

6. A reduction gear comprising a driving pinion member having a single row of helical teeth, means for limiting the longitudinal movement of the driving pinion, a plurality of intermediate gear members meshing with the driving pinion, an intermediate pinion having right and left hand rows of helical teeth driven by each intermediate gear, a driven gear having right and left hand rows of helical teeth meshing with the intermediate pinions, and means for limiting the longitudinal movements of the driven gear, the helix angle of one row of teeth of the driven gear and the intermediate pinions being such as to develop a longitudinal component of thrust which reacts equally against the thrust created by the remaining row of teeth of the driven gear and the intermediate pinions and by the intermediate gears and the driving pinion.

In testimony whereof, I have hereunto subscribed my name this 23rd day of September, 1921.

FRANCIS HODGKINSON.